United States Patent [19]
Kawamura et al.

[11] Patent Number: 5,796,871
[45] Date of Patent: Aug. 18, 1998

[54] METHOD AND APPARATUS FOR REPRODUCING ENCODED DATA

[75] Inventors: Makoto Kawamura, Kanagawa; Yoshinori Shimizu, Tokyo; Yasushi Fujinami, Kanagawa, all of Japan

[73] Assignee: Sony Corporation, Tokyo, Japan

[21] Appl. No.: 588,458

[22] Filed: Jan. 18, 1996

[30] Foreign Application Priority Data

Jan. 31, 1995 [JP] Japan .................... 7-032943

[51] Int. Cl.$^6$ ........................................ H04N 7/32
[52] U.S. Cl. .................. 382/236; 358/430; 348/411; 386/110
[58] Field of Search .................... 358/430; 348/411–415; 386/69–70, 91, 110–112, 27, 33, 109; 382/233, 236; H04N 7/32, 5/92

[56] References Cited

U.S. PATENT DOCUMENTS

| | | | |
|---|---|---|---|
| 5,485,279 | 1/1996 | Yonemitsu et al. | 348/411 |
| 5,557,331 | 9/1996 | Honjo . | |
| 5,574,504 | 11/1996 | Yagasaki et al. | 348/415 |
| 5,619,338 | 4/1997 | Nakai et al. | 386/70 |

FOREIGN PATENT DOCUMENTS

| | | | |
|---|---|---|---|
| 0 274 255A | 7/1988 | European Pat. Off. . | |
| WO 94 07332A | 3/1994 | WIPO . | |
| WO 94 17631A | 8/1994 | WIPO . | |

*Primary Examiner*—Kim Vu
*Attorney, Agent, or Firm*—Frommer Lawrence & Haug LLP; William S. Frommer

[57] ABSTRACT

A method and apparatus for reproducing data compressed in accordance with a motion picture experts group (MPEG) standard and recorded on a recording medium. The data represents a plurality of frames which correspond to a plurality of groups of pictures (GOPs), in which each of the GOPs includes different types of pictures including intraframe predictively (I) encoded and interframe predictively (P) encoded pictures. The compressed data is read from the recording medium, and the type of pictures corresponding to the read data is determined. The read image data is decoded and supplied to a display device. When special processing (such as, random accessing) is performed, image data may not be properly decoded during an initial period. During this time period, an auxiliary signal may be supplied to the display device. Such supply of the auxiliary signal continues until image data corresponding to an intraframe predictively encoded (I) picture and either another intraframe predictively encoded (I) picture or an interframe predictively encoded (P) picture are detected, whereupon the respective image data is properly decoded by utilizing the image data corresponding to the detected P and/or I pictures and supplied to the display device instead of the auxiliary signal.

24 Claims, 14 Drawing Sheets

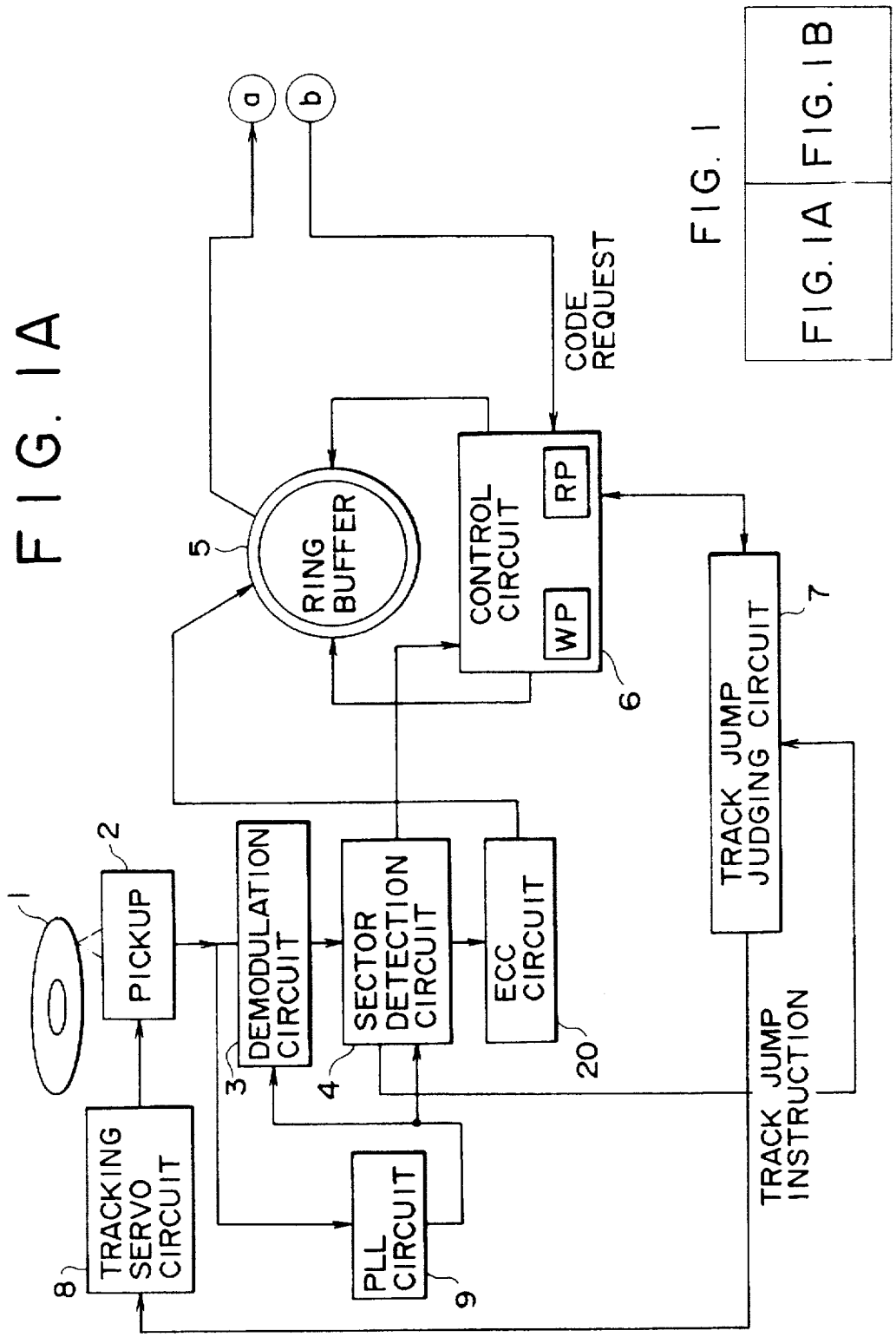

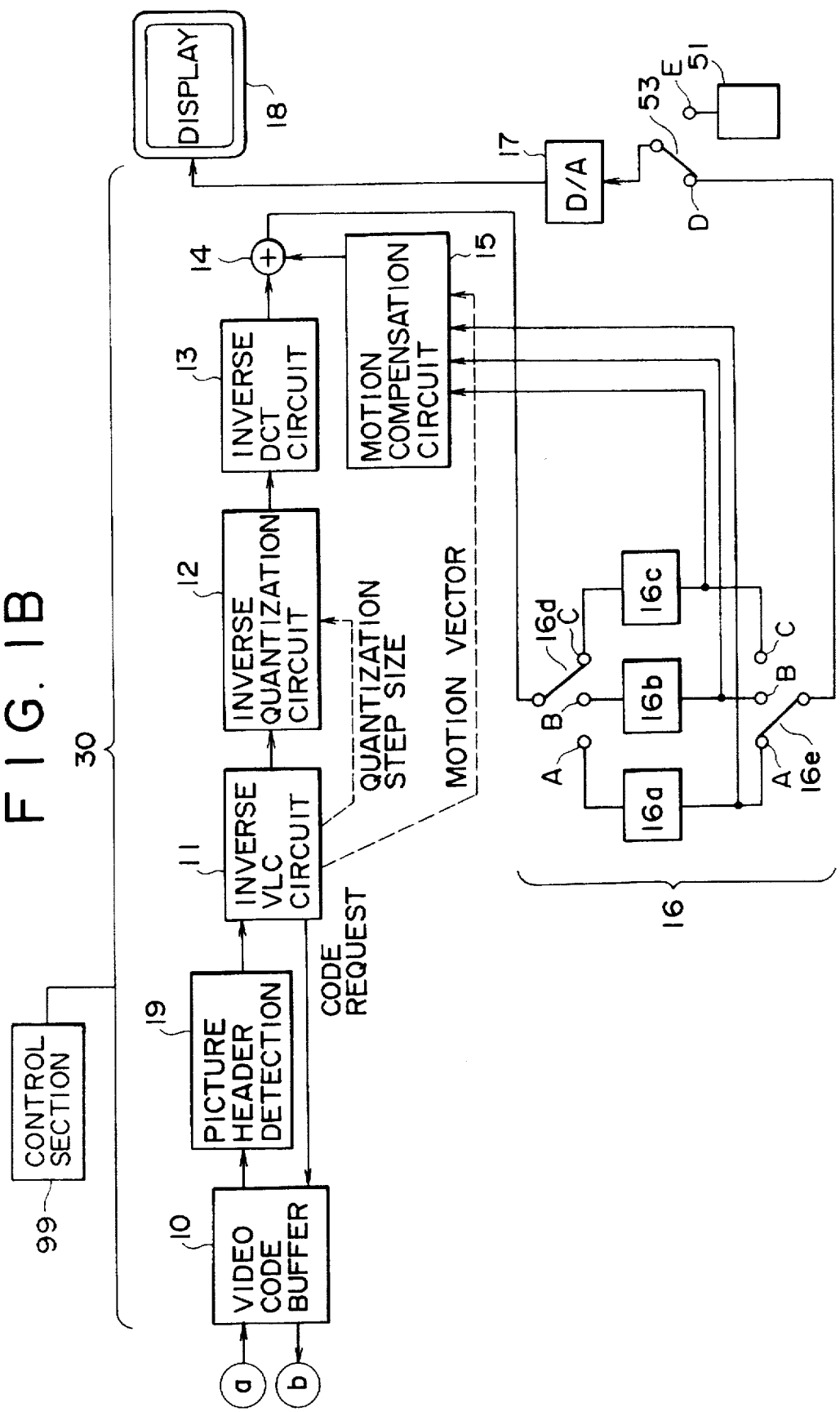

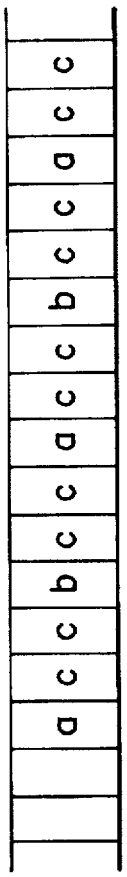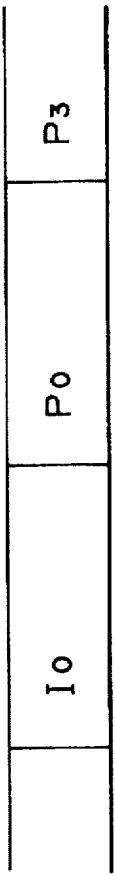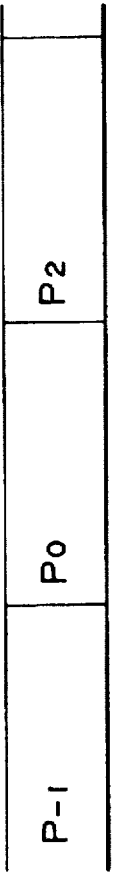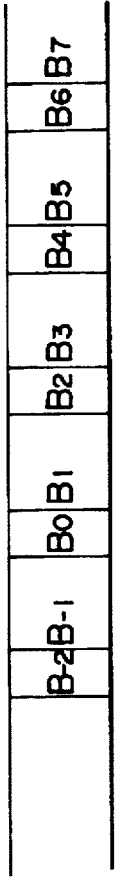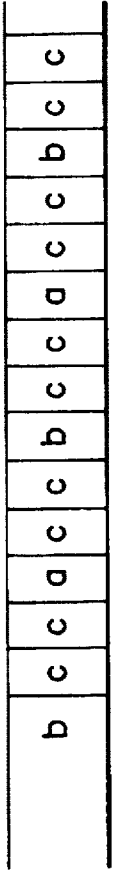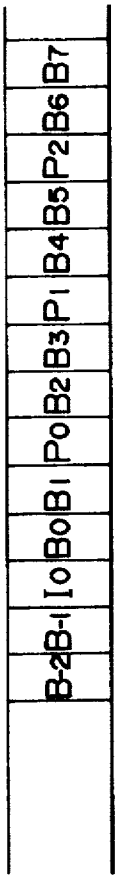
FIG. 2A SWITCH 16d
FIG. 2B MEMORY 16a
FIG. 2C MEMORY 16b
FIG. 2D MEMORY 16c
FIG. 2E SWITCH 16e
FIG. 2F DISPLAY

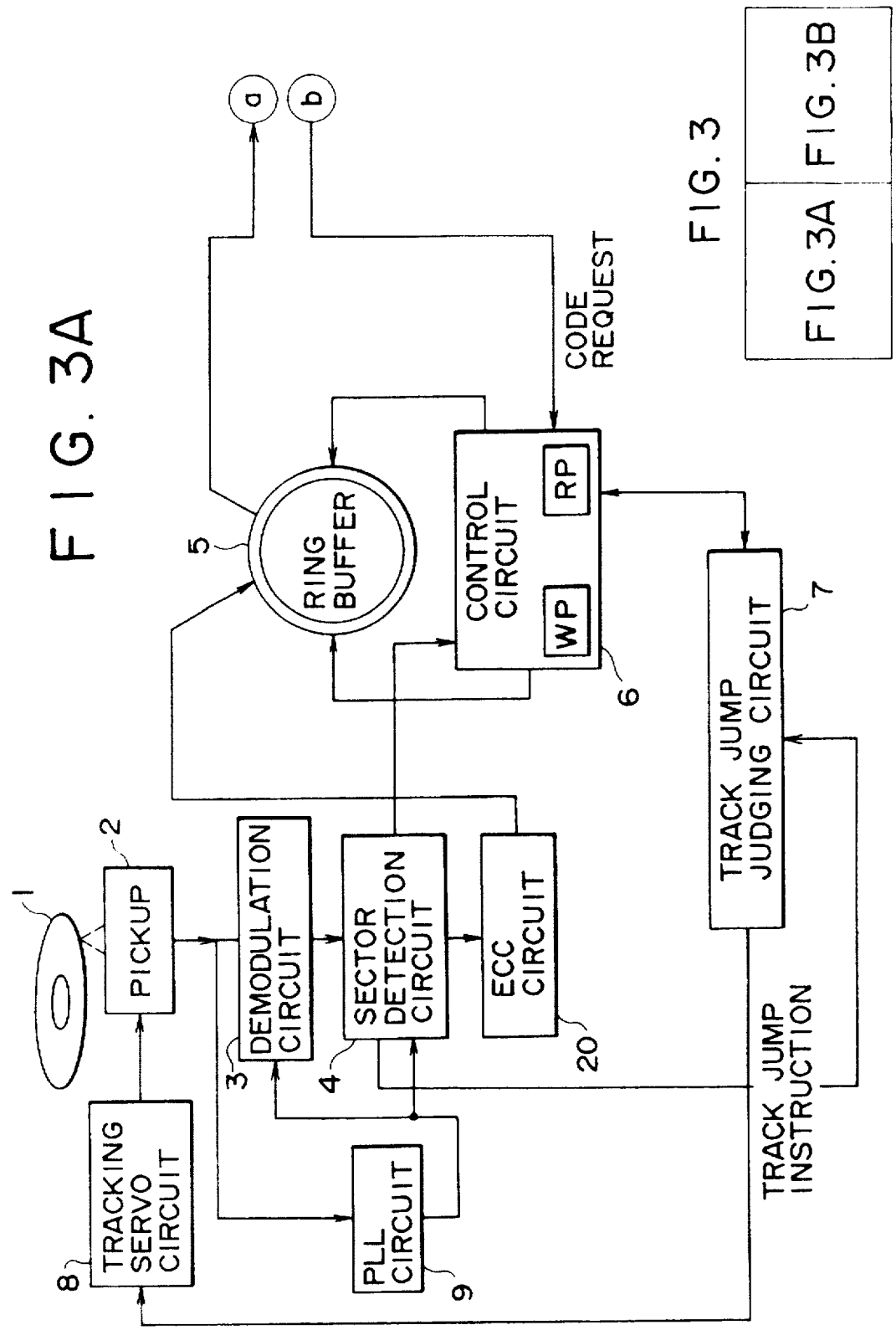

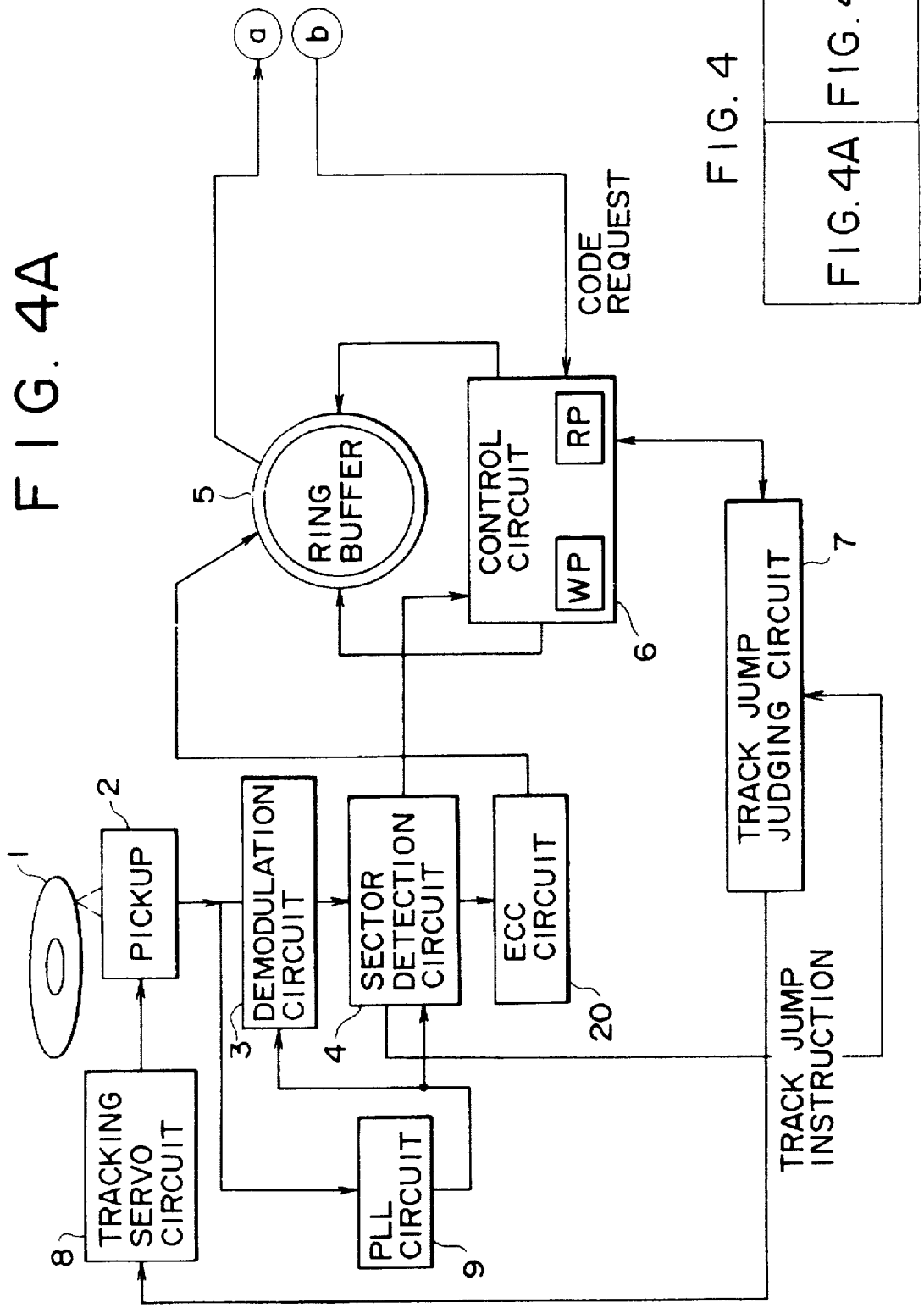

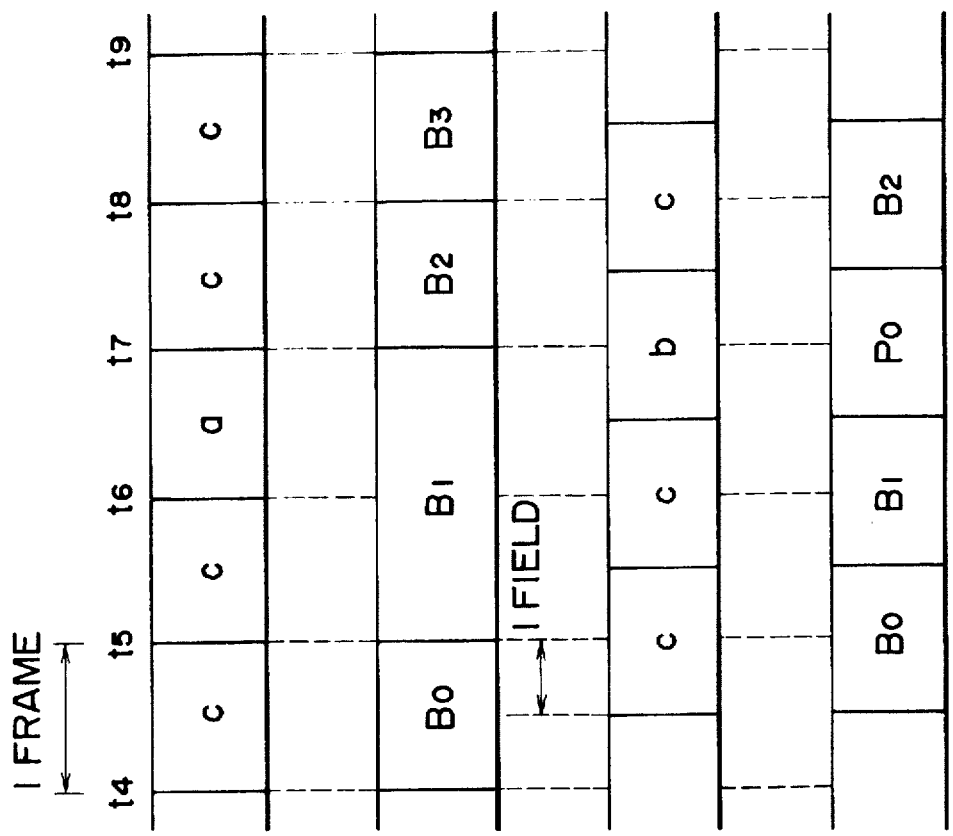

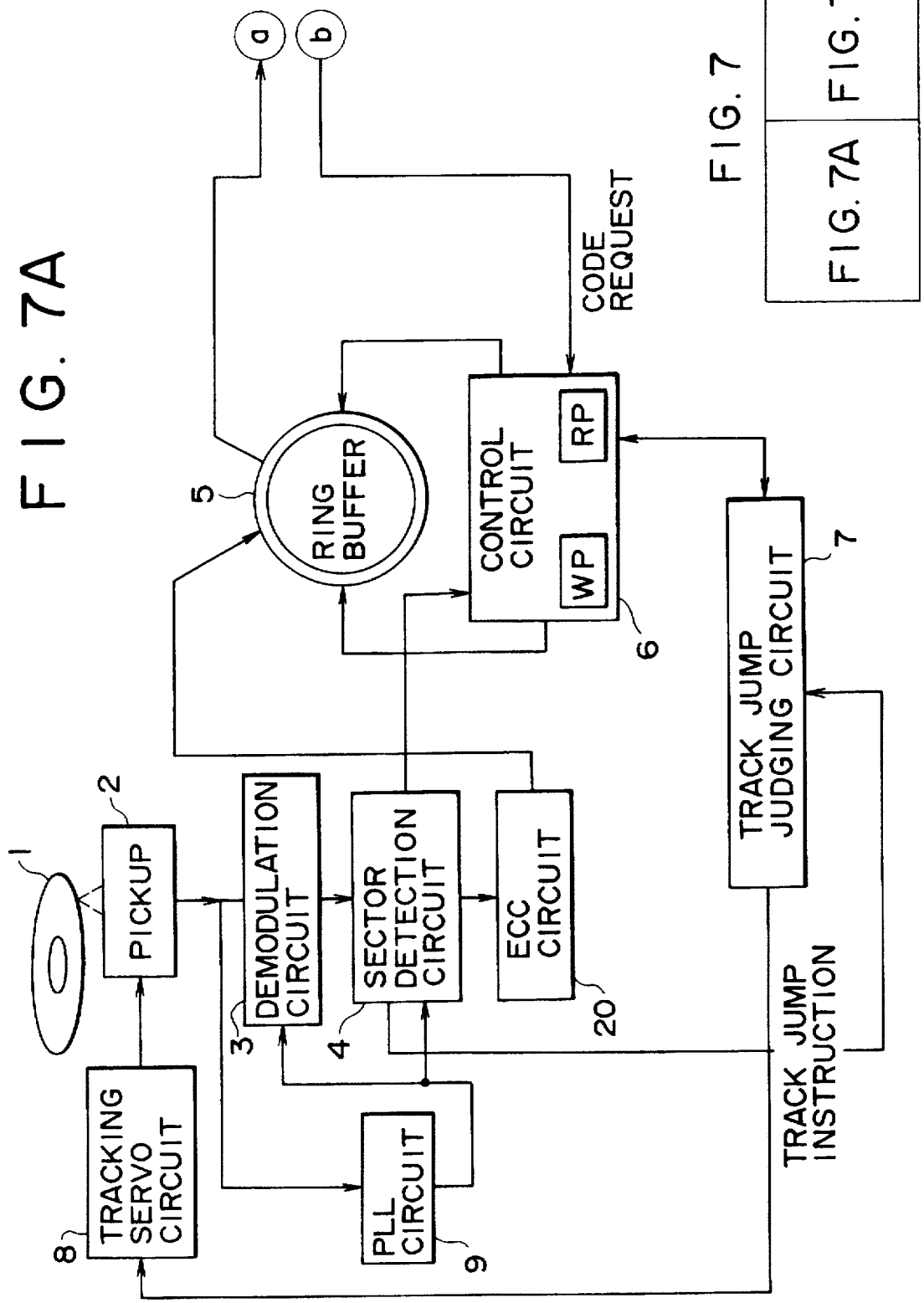

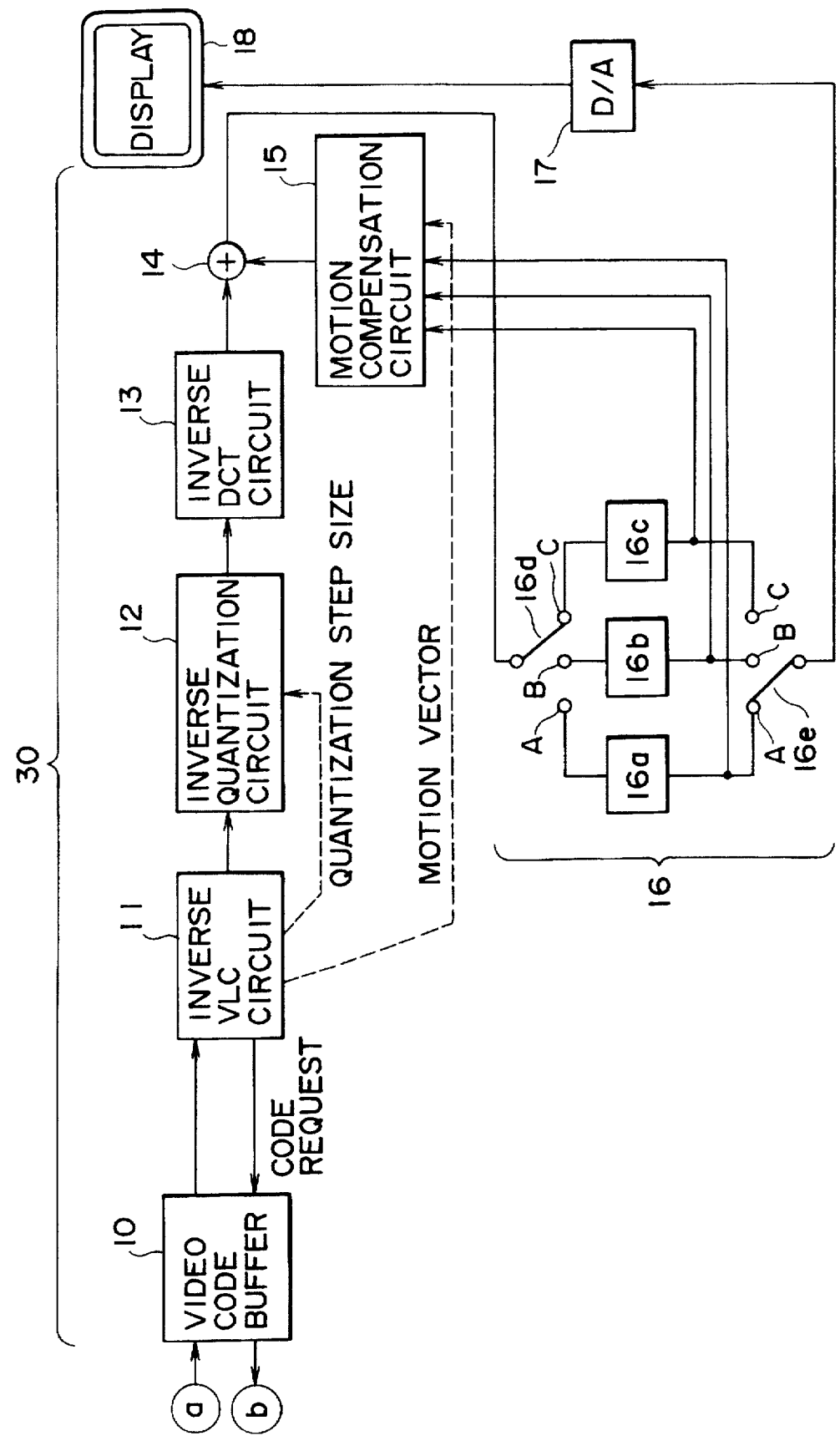

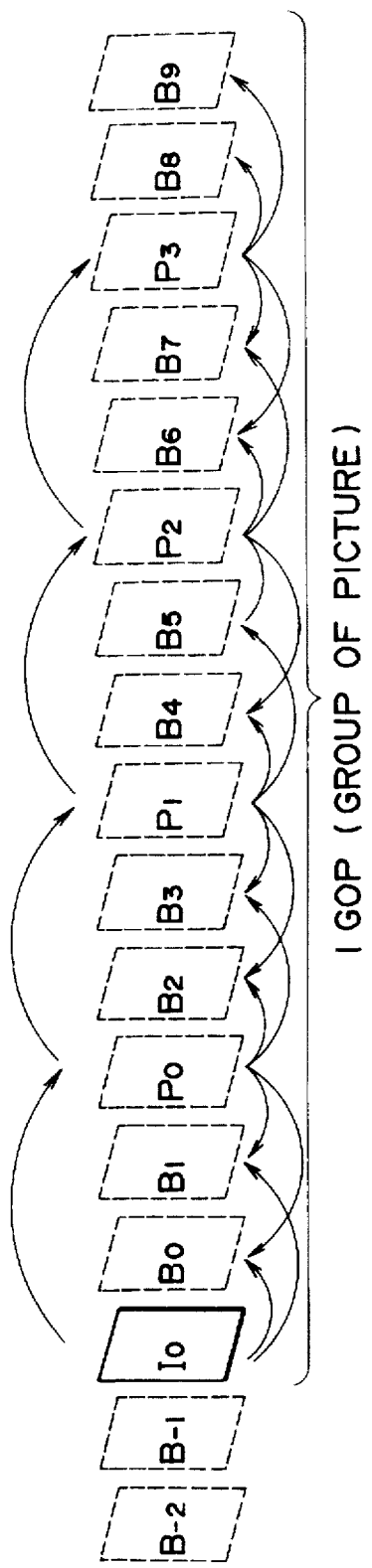
FIG. 8A STRUCTURE FOR INTERFRAME PREDICTION
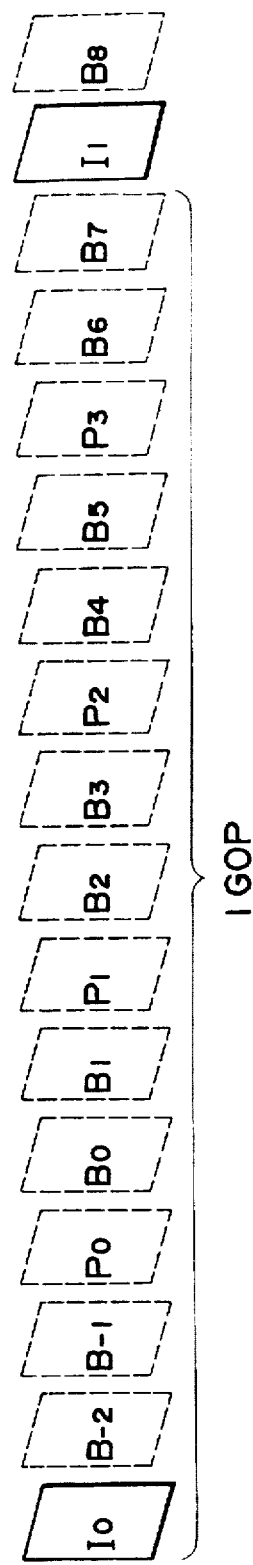
FIG. 8B STRUCTURE FOR RECORDED FRAME FIG. 10A  ......, B-4, B-3, P-1, B-2, B-1, Io, Bo, B1, Po, ......

$\Rightarrow$

FIG. 10B  ......, P-1, B-4, B-3, Io, B-2, B-1, Po, Bo, B1, ......

ENTRY POINT →

FIG. 10C  Io, B-2, B-1, Po, Bo, B1, ......

METHOD AND APPARATUS FOR REPRODUCING ENCODED DATA

BACKGROUND OF THE INVENTION

The present invention relates to a technique for reproducing compressed image data which may be recorded on optical discs, magnetic discs or the like and, more particularly, to such technique wherein the image data is compressed by a moving or motion picture experts group (MPEG) system.

A MPEG system may be utilized to compression-encode digital image signals which may be recorded in a digital video disc (hereinafter, a DVD). In the MPEG system, compression may be performed by utilizing predictive encoding and discrete cosine transform (DCT).

FIG. 8A illustrates a structure for interframe prediction in accordance with predictive encoding in an MPEG system. As shown therein, such structure or arrangement includes a plurality of frames or pictures. Each of such pictures is either an intraframe predictively encoded (I) picture, an interframe predictively encoded (P) picture or a bi-directionally predictively encoded (B) picture. A plurality of frames or pictures in a sequence of motion pictures may form a so-called group of pictures (GOP). For example, the GOP 1 of FIG. 8A has 15 frames which include one I picture or frame, four P pictures or frames, and ten B pictures or frames. A GOP may be utilized as an encoding unit.

An I picture may be formed or generated by using only image data of that one respective frame or picture and, as such, is an intraframe predictively encoded picture. A P picture may be formed from image data representing a temporally preceding and previously decoded I or P picture and, as such, is an interframe predictively encoded picture. In other words, a P picture is an interframe predictive encoded picture in a forward direction formed with reference to an already encoded and preceding (in time) I or P picture or frame. A B picture may be formed by using image data representing two frames—one preceding and another succeeding in time so as to be bi-directionally predictive encoded.

The above-described formation of the I, P and B pictures is illustrated in FIG. 8A. That is, the arrows illustrated in FIG. 8A indicate the picture or pictures utilized to form a respective picture. For example, the P picture $P_0$ is predictively encoded with reference to I picture $I_0$, P picture $P_1$ is predictively encoded with reference to P picture $P_0$, P picture $P_2$ is predictively encoded with reference to P picture P1 and so forth. As another example, B pictures $B_0$ and $B_1$ are each predictively encoded with reference to both I picture $I_0$ and P picture $P_0$, B pictures $B_2$ and $B_3$ are each predictively encoded with reference to P pictures $P_0$ and $P_1$, and so forth. Since I picture $I_0$ is predictively encoded by using only image data of that respective frame or picture, there are no arrows which indicate that picture I0 is formed with reference to another picture or pictures. As is to be appreciated, other I, P and B pictures are similarly formed.

Since an I picture may be predictively encoded by use of data within only the I picture or frame itself, such I picture may be decoded by use of only the I picture. On the other hand, since a respective P picture is predictively encoded with reference to the preceding I picture or P picture in time, such preceding I or P picture is required for the respective P picture to be decoded. In a similar manner, since a B picture is predictively encoded with reference to the preceding and succeeding I or P picture in time, such preceding or succeeding I or P picture is required for the B picture to be decoded. As a result, pictures may be rearranged such that the picture(s) required for decoding a respective picture are decoded prior to decoding the respective picture. For example, the pictures may be rearranged as shown in FIG. 8B. That is, since B pictures $B_{-1}$ and $B_{-2}$ require I picture $I_0$ upon decoding, I picture $I_0$ is arranged to precede B pictures $B_{-1}$ and $B_{-2}$. Since B pictures $B_0$ and $B_1$ require I picture $I_0$ and P picture $P_0$ upon decoding, P picture $P_0$ is arranged to precede B pictures $B_0$ and $B_1$. (As is to be appreciated, I picture I0 already precedes B pictures $B_0$ and $B_1$.) Since B pictures $B_2$ and $B_3$ require P pictures $P_0$ and $P_1$ upon decoding, P picture $P_1$ is arranged to precede B pictures $B_2$ and B3. (As is to be appreciated, P picture $P_0$ already precedes B pictures B2 and $B_3$.) Since B pictures $B_4$ and $B_5$ require P pictures $P_1$ and $P_2$, P picture $P_2$ is arranged to precede B pictures $B_4$ and $B_5$. (As is to be appreciated, P picture $P_1$ already precedes B pictures B4 and $B_5$.) For similar reasons, P picture $P_3$ is arranged to precede B pictures $B_6$ and $B_7$.

The I, P and B pictures arranged as shown in FIG. 8B may be recorded in a DVD or other recording medium. Since the pictures are encoded by a MPEG system or in accordance with a MPEG standard as previously described, the quantity or amount of codes associated with each of the pictures may not be identical, but instead may be different depending on the complexity and the flatness of the respective images.

Pictures recorded in a DVD may arranged within sectors in which each sector enables a predetermined quantity or amount of codes or data to be stored therein. As a result, one picture may occupy one, less than one or more than one sector. Furthermore, each picture is successively recorded in the sectors in a wrap-around manner. An example of a plurality of pictures recorded within sectors is illustrated in FIG. 9. As shown therein, I picture $I_0$ is recorded in sector m, sector (m+1) and a portion of sector (m+2); B picture $B_{-2}$ is recorded in the remaining region of sector (m+2) and sector (m+3); and so forth. In this example, 1 GOP is recorded from sector m to sector (m+21). However, the quantity of codes or data may be different for each GOP depending on the complexity or flatness of the images represented therein. Accordingly, the number of sectors required for recording the data of one GOP may be different between GOPs.

An apparatus for reproducing data which has been compressed and recorded by a MPEG system from a DVD is illustrated in FIG. 7. As shown therein, such apparatus generally includes a pickup 2, a demodulation circuit 3, a sector detection circuit 4, a ring buffer 5, a control circuit 6, a track jump judging circuit 7, a servo circuit 8, a phase locked loop (PLL) 9, an error correction circuit (ECC) 20 and a decoder 30. Such decoder 30 may include a video code buffer 10, an inverse variable length coding (VLC) circuit 11, an inverse quantization circuit 12, an inverse discrete cosine transform (DCT) circuit 13, an addition circuit 14, a motion compensation circuit 15, and a frame memory 16 which are coupled as shown in FIG. 7.

Digital data compressed by a MPEG system is recorded in tracks or sectors having a fixed length (as in FIG. 9) on a disc 1. A sector sync and a sector header may be added to a predetermined portion of each of the sectors, such as the top thereof. The disc 1 may be rotated in a predetermined rate or manner by a spindle motor (not shown). The pickup 2 produces a laser beam which is irradiated on the tracks of the optical disc 1 so as to read out the recorded data. Control for the pickup 2, such as focus control and tracking control, may be performed by the tracking and focus servo circuit 8. That is, the circuit 8 may provide a focused error signal and/or a tracking error signal to the pickup 2. Such focused and tracking error signals may be obtained from information read out from the pickup 2.

The read out digital data from the pickup 2 are supplied to the demodulation circuit 3, whereupon a predetermined demodulation such as EFM-demodulation is performed. (EFM is eight-to-fourteen modulation wherein a symbol having eight bits is converted to a symbol having fourteen bits.) The demodulated data is supplied to the sector detection circuit 4. The read out data from the pickup 2 are further supplied to the PLL circuit 9 so as form or regenerate clock signals which are supplied to the demodulation circuit 3 and the sector detection circuit 4. Such clock signals may be utilized in controlling the timing of the processing performed by the circuits 3 and 4.

As previously described, the sector detection circuit 4 receives demodulated data from the demodulation circuit 3. From such received data, the sector detection circuit 4 detects the sector sync so as to determine the boundary of the sectors and detects a sector address or the like from the sector header. An output signal representative of such detection(s) is supplied to the control circuit 6.

The demodulated data is supplied by way of the sector detection circuit 4 to the ECC circuit 20, whereupon error detection and correction may be performed. The error corrected data from the ECC circuit 20 is supplied to the ring buffer 5 and is written therein in accordance with a write control signal supplied by the control circuit 6.

The control circuit 6 generates the write control or write pointer (WP) signal based on the sector address for each of the sectors detected by the sector detection circuit 4 and supplies the WP signal to the ring buffer 5. Such WP signal indicates a write address wherein a sector may be written into the ring buffer 5. As a result of the WP signal, data from the ECC circuit 20 may be written into designated address locations of the ring buffer 5. The control circuit 6 further generates a read pointer (RP) signal based on a code request signal from the video code buffer 10 (in the succeeding stage of FIG. 7B) and supplies the RP signal to the ring buffer 5. Such RP signal indicates an address of data written into the ring buffer 5 which is desired to be read out. As a result, upon receiving a RP signal, data from the desired address location or position of the ring buffer 5 is read out and supplied to the video code buffer 10, whereupon such data is stored therein.

Therefore, the video code buffer 10 may generate a code request signal (which requests that data from the ring buffer 5 be transmitted to the video code buffer 10) and supply the same to the control circuit 6 whereupon, in response thereto, data is supplied from the ring buffer 5 to the video code buffer 10. The video code buffer 10 may further receive a code request signal from the inverse VLC circuit 11. In response thereto, data stored in the video code buffer 10 may be supplied to the inverse VLC circuit 11, whereupon inverse VLC processing is performed. Upon completing such inverse VLC processing, the processed data may be supplied to the inverse quantization circuit 12 and another code request signal may be supplied to the video code buffer 10 so as to request new data therefrom. The inverse VLC circuit 11 may also supply the size of a quantization step to the inverse quantization circuit 12 and a motion vector information signal to the motion compensation circuit 15.

The inverse quantization circuit 12 inversely quantizes the data received from the inverse VLC circuit 11 in accordance with the size of the quantization step and outputs the obtained processed signal to the inverse DCT circuit 13, whereupon inverse DCT processing is performed. An output signal from the inverse DCT circuit 13 is supplied to one input terminal of the addition circuit 14. An output from the motion compensation circuit 15 formed in accordance with the type of picture (that is, I, P or B), as hereinafter more fully described, is supplied to another input terminal of the addition circuit 14. The addition circuit 14 adds the received signals and supplies the obtained summed signal, by way of a switch 16d, through the appropriate one of contacts A–C to one of memories 16a, 16b and 16c of the frame memory bank 16 so as to be stored therein. Stored signals from the memories 16a, 16b and 16c may be supplied to the motion compensation circuit 15.

The operation performed by the motion compensation circuit 15 and the frame memory bank 16 will now be further described. For this discussion, assume that a recording frame shown in FIG. 8B is reproduced. If the respective reproduced frame is an I picture or frame, then interframe prediction is not applied to such I picture upon decoding. As a result, a zero or no output signal is supplied from the motion compensation circuit 15 to the addition circuit 14 so that the output signal from the inverse DCT circuit 13 is supplied to the frame memory bank 16. However, if the respective reproduced frame is a P picture or a B picture, then the decoded I or P picture(s) needed to decode such respective P or B picture (the decoded I or P picture corresponds to the picture or pictures utilized during predictive encoding) is supplied from the appropriate one of the memories 16a, 16b or 16c of the frame memory bank 16 to the motion compensation circuit 15, wherein a motion prediction image signal is formed with the motion vector information supplied from the inverse VLC circuit 11 and supplied to the addition circuit 14. As a result, the motion prediction image signal and the output signal from the inverse DCT circuit 13 are added in the addition circuit 14 so as to decode the respective picture and the decoded picture is stored in the frame memory bank 16.

Data from the memories 16a–16c of the frame memory 16 are read out under control through contacts A–C by way of a switch 16e so as to restore the original frame order, such as to that shown in FIG. 8A. The read out data are converted by a digital-to-analog (D/A) converter 17 into analog video signals and supplied to a display 18 so as to be displayed thereon.

Therefore, the control circuit 6 causes data stored in the ring buffer 5 to be supplied to the video code buffer 10 in accordance with the code request signal from the video code buffer 10. When data processing of relatively simple video images is being performed and the amount of data transmitted from the video code buffer 10 to the inverse VLC circuit 11 decreases, the amount of data transmitted from the ring buffer 5 to the video code buffer 10 may also decrease. As a result, the amount of data stored in the ring buffer 5 may increase so as to cause an overflow condition of the ring buffer 5. In other words, the amount of data written into the ring buffer 5 by use of the WP signal may surpass the amount read out therefrom by use of the RP signal. To avoid such overflow condition, the quantity of data currently stored in the ring buffer 5 may be determined or calculated by, for example, utilizing address positions of the WP and RP signals controlled by the control circuit 6. Such determination may be performed by the track jump judging circuit 7. If the amount of the data determined to be stored in the ring buffer 5 exceeds a predetermined reference value, a track jump instruction signal is generated by the track jump judging circuit 7 and supplied therefrom to the tracking servo circuit 8. As a result, the pickup 2 may move or jump from the current track to another track. Therefore, the track jump judging circuit 7 determines if the ring buffer 5 may overflow and outputs a track jump instruction signal in response to such determination so as to cause the pickup to jump.

The rate at which data is transmitted from the ring buffer 5 to the video code buffer 10 may be equal to or smaller than the rate at which data is transmitted from the ECC circuit 20 to the ring buffer 5. As is to be appreciated, such arrangement of transmission rates prevents the ring buffer 5 from being depleted of data. Furthermore, such arrangement of transmission rates enables the video code buffer 10 to transmit a code request signal to the ring buffer 5 irrespective of the timing of the track jump. As previously described, such code request signal requests that data from the ring buffer 5 be transmitted to the video code buffer 10.

Therefore, the data reproducing apparatus of FIG. 7 causes the pickup 2 to track jump in accordance with the memory capacity of the ring buffer 5. As a result, overflow or underflow of the video code buffer 10 may be prevented, irrespective of the complexity or flatness of the video images recorded in the disc 1, so as to enable video images of uniform image quality to be continuously reproduced.

Although the data reproducing apparatus of FIG. 7 may perform satisfactorily when operating in a normal reproduction mode, problems may arise when such apparatus performs so-called random accessing or operates in other modes such as a mode transition. More specifically, compression-encoded picture data having an order of . . . , $B_{-4}, B_{-3}, P_{-1}, B_{-2}, B_{-1}, I_0, B_0, B_1, P_0, \ldots$ as shown in FIG. 10A may be rearranged as described above and as shown in FIG. 10B and recorded in the disc 1 (FIG. 7). In a normal reproduction or regeneration mode, if picture data read out from the disc 1 are decoded successively and stored in the memory bank 16, the stored decoded data can be read out from the frame memory bank 16 in the display order shown in FIG. 10A. However, when random accessing (such as, a track search, a chapter search or a time code search) or a mode transition is to be performed, an entry point is utilized. For example, such entry point may be defined at a position corresponding to I picture $I_0$ as shown in FIG. 10C. In this example, picture data are read out from the disc 1 in the order of $I_0, B_{-2}, B_{-1}, P_0, B_0, B_1, \ldots$, as shown in FIG. 10C. The I picture $I_0$ is an intraframe predictively encoded image which can be decoded by utilizing only the $I_0$ picture. However, the B pictures $B_{-2}$ and $B_{-1}$ require P picture $P_{-1}$ and I picture $I_0$ for decoding. Since processing begins at the entry point of the I picture $I_0$, the P picture P-1 has not been read out and decoded. Accordingly, the B pictures $B_{-2}$ and $B_{-1}$ cannot be correctly decoded. As a result, incorrectly decoded B pictures B-2 and B-1 are supplied from the decoder 30 to the display 18 (FIG. 7B), thereby causing deformed images to be displayed thereon.

OBJECTS AND SUMMARY OF THE INVENTION

An object of the present invention is to provide a method and apparatus for reproducing encoded data such that proper images are displayed even during a mode transition, random accessing or the like.

More specifically, it is an object of the present invention to provide a method and apparatus as aforesaid wherein, when image data normally incapable of being properly decoded (such as may occur during random accessing or a mode transition) is read or detected, images are properly decoded and displayed after an intraframe predictively encoded (I) image picture and either another intraframe predictively encoded (I) image picture or an interframe predictively encoded (P) image picture are detected.

Another object of the present invention is to provide a method and apparatus as aforesaid wherein blue back images or previously stored decoded images are displayed when image data normally incapable of being properly decoded is read until properly decoded images can be displayed which occurs after the I image picture and either the second I image picture or the P image picture are detected.

A further object of the present invention is to provide a method and apparatus as aforesaid wherein video signals compression-encoded by an MPEG system and recorded along with audio signals onto a digital video disc or similar medium are reproduced.

In accordance with an aspect of the present invention, a method is provided for reproducing compressed encoded image data from a recording medium by utilizing correlation in a direction of a time axis in which the encoded image data represents a plurality of frames which correspond to at least one group of pictures (GOP) having a picture or pictures unable to be properly predictively decoded wherein each GOP includes different types of pictures including intraframe predictively (I) encoded and interframe predictively (P) encoded pictures. The method comprises the steps of: detecting the image data corresponding to a first intraframe predictively encoded (I) picture and either a second intraframe predictively encoded (I) picture or an interframe predictively encoded (P) picture; and outputting properly decoded image data after the detection of the image data corresponding to the first intraframe predictively encoded (I) picture and either the second intraframe predictively encoded (I) picture or the interframe predictively encoded (P) picture.

In accordance with another aspect of the present invention, an apparatus for reproducing compressed encoded image data is provided. The apparatus comprises a device for reading the encoded image data from a recording medium by utilizing a correlation in a time axis direction, wherein the image data represents a plurality of frames which correspond to at least one group of pictures (GOP) in which each GOP includes different types of pictures including intraframe predictively (I) encoded and interframe predictively (P) encoded pictures; and a picture type detection device for detecting the type of pictures of the read image data. The apparatus further comprises a device for decoding the read image data and for outputting the decoded image data. The decoding device is operative to properly decode and output the read image data after detection of the image data corresponding to an intraframe predictively encoded (I) picture and either another intraframe predictively encoded (I) picture or an interframe predictively encoded (P) picture when the reading device reads image data corresponding to a respective GOP having a picture or pictures normally unable to be properly predictively decoded.

In the present invention, when picture image data is read which is normally unable to be properly decoded, such picture image data is not decoded and outputted until after the detection of an I picture and either another I picture or a P picture. Upon such detection, the detected P and/or I pictures may be stored within a memory and utilized for decoding such picture image data. As a result, such picture image data may be properly decoded and displayed, thereby preventing the display of deformed images. Furthermore, previously decoded or blue back images may be displayed after picture image data is read which is normally unable to be properly decoded until such picture image may be properly decoded and outputted (which occurs after the detection of an I picture and either another I picture or a P picture). As a result, differences or incongruities in the display images during random accessing, mode switching or the like may be minimized.

The previously decoded image data, or selected portions thereof, may be stored within a memory such as a frame memory. As previously described, such stored decoded image data may be outputted when the read picture image data is unable to be properly decoded until such read picture image data may be properly decoded and outputted.

Other objects, features and advantages of the present invention will become apparent from the following detailed description of the illustrated embodiments when read in conjunction with the accompanying drawings in which corresponding components are identified by the same reference numerals.

BRIEF DESCRIPTION OF THE DRAWINGS

FIGS. 1A and 1B are diagrams illustrating an apparatus for reproducing encoded data according to an embodiment of the present invention;

FIGS. 2A to 2F are diagrams to which reference will be made in explaining writing/reading timing to and from a frame memory bank in the present reproducing apparatus;

FIGS. 3A and 3B are diagrams illustrating an apparatus for reproducing encoded data according to another embodiment of the present invention;

FIGS. 4A and 4B are diagrams illustrating an apparatus for reproducing encoded data according to still another embodiment of the present invention;

FIGS. 6A to 6D are diagrams to which reference will be made in explaining the writing/reading timing to and from a frame memory bank in the present reproducing apparatus;

FIGS. 7A and 7B are diagrams illustrating an apparatus for reproducing encoded data to which reference will be made in explaining the background of the present invention;

FIGS. 8A and 8B are diagrams respectively illustrating a structure for interframe prediction and a recording structure in accordance with a MPEG standard;

FIGS. 10A to 10C are diagrams of a frame structure to which reference will be made in explaining the operation of the present reproducing apparatus during normal reproduction and random accessing.

DETAILED DESCRIPTION OF PREFERRED EMBODIMENTS

Figure 3B:
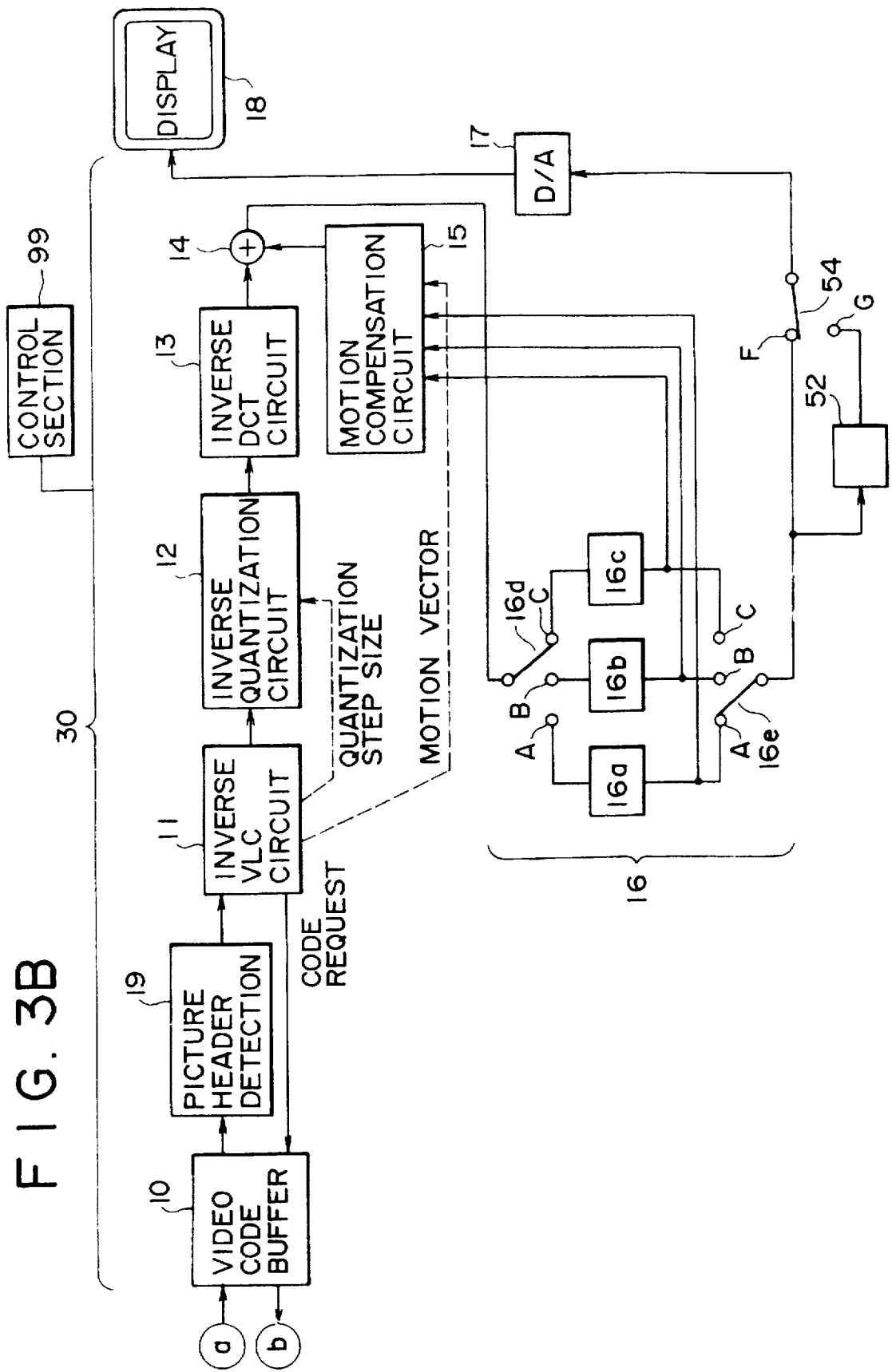

FIG. 1 illustrates an apparatus for reproducing encoded data according to a preferred embodiment of the present invention. With the exception of a picture header detection circuit 19, a blue back signal generator 51, a switch 53 and a control section 99, the apparatus of FIG. 1 is similar to that of FIG. 7. That is, the apparatus of FIG. 1 generally includes the pickup 2, the demodulation circuit 3, the sector detection circuit 4, the ring buffer 5, the control circuit 6, the track jump judging circuit 7, the servo circuit 8, the PLL 9, the ECC 20, the video code buffer 10, the picture header detection circuit 19, the inverse variable length coding (VLC) circuit 11, the inverse quantization circuit 12, the inverse DCT circuit 13, the addition circuit 14, the motion compensation circuit 15, the frame memory 16, the blue back generator 51, the switch 53 and the control section 99 which are coupled as shown in FIG. 1.

Figure 9:
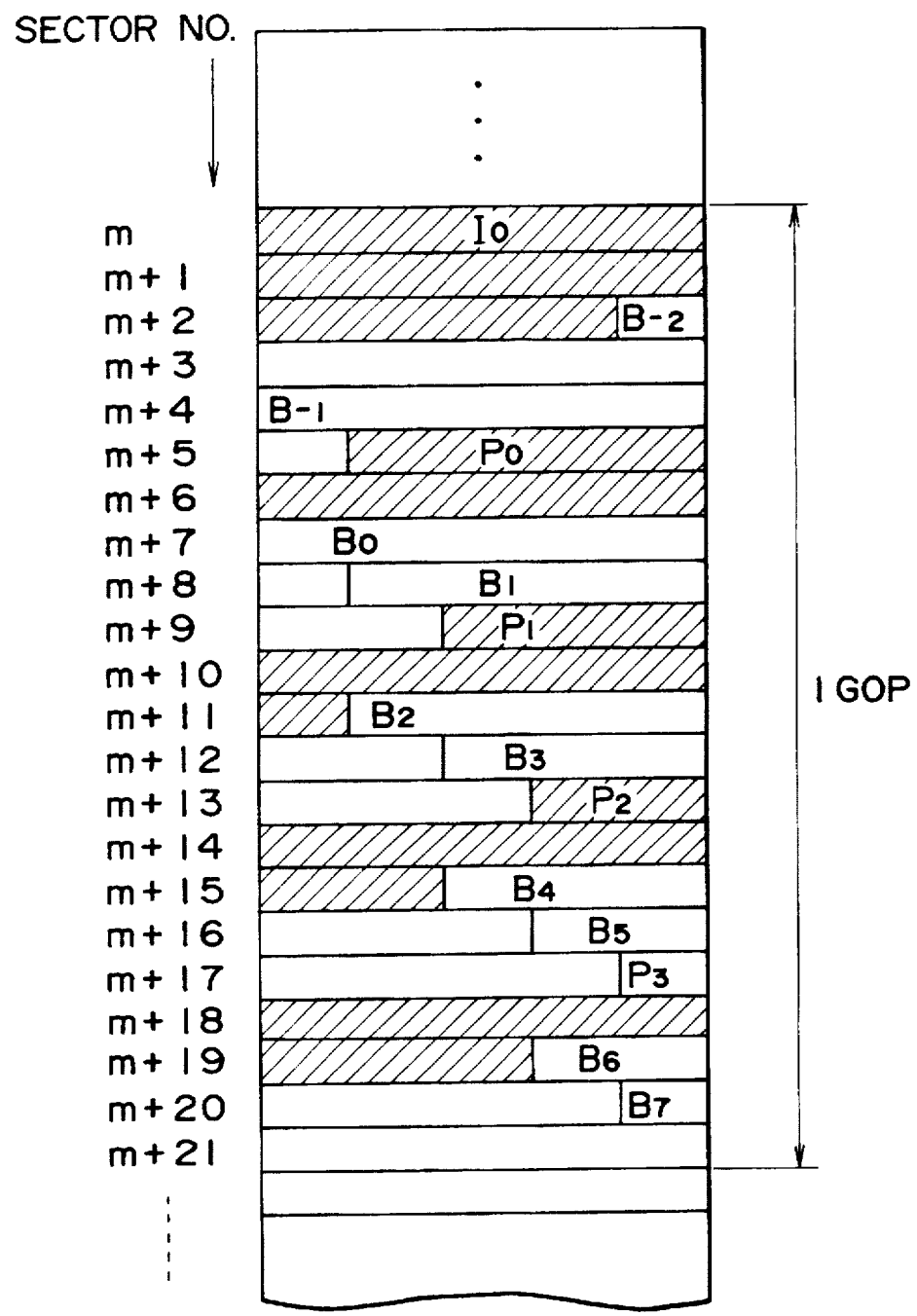
FIG. 9 is a diagram to which reference will be made in explaining a mode of recording pictures by sectors in a MPEG system.

In a manner similar to that previously described, digital data compressed by a MPEG system is recorded in tracks or sectors having a fixed length (as in FIG. 9) on the disc 1. A sector sync and a sector header may be added to a predetermined portion of each of the sectors, such as the top thereof. The disc 1 may be rotated in a predetermined rate or manner by a spindle motor (not shown). The pickup 2 produces a laser beam which is irradiated on the tracks of the optical disc 1 so as to read out the recorded data. Control for the pickup 2, such as focus control and tracking control, may be performed by the tracking and focus servo circuit 8. That is, the circuit 8 may provide a focused error signal and/or a tracking error signal to the pickup 2. Such focused and tracking error signals may be obtained from information read out from the pickup 2. The read out digital data from the pickup 2 are supplied to the demodulation circuit 3, whereupon a predetermined demodulation such as EFM-demodulation is performed. The demodulated data is supplied to the sector detection circuit 4. The read out data from the pickup 2 are further supplied to the PLL circuit 9 so as to form or regenerate clock signals which are supplied to the demodulation circuit 3 and the sector detection circuit 4. Such clock signals may be utilized in controlling the timing of the processing performed by the circuits 3 and 4. From the demodulated data received from the demodulation circuit 3, the sector detection circuit 4 detects the sector sync so as to determine the boundary of the sectors and detects a sector address or the like from the sector header. An output signal representative of such detection(s) is supplied to the control circuit 6. The demodulated data is supplied by way of the sector detection circuit 4 to the ECC circuit 20, whereupon error detection and correction may be performed. The error corrected data from the ECC circuit 20 is supplied to the ring buffer 5 and is written therein in accordance with a write control signal supplied by the control circuit 6. The control circuit 6 generates the write control or write pointer (WP) signal based on the sector address for each of the sectors detected by the sector detection circuit 4 and supplies the WP signal to the ring buffer 5. Such WP signal indicates a write address wherein a sector may be written into the ring buffer 5. As a result of the WP signal, data from the ECC circuit 20 may be written into designated address locations of the ring buffer 5. The control circuit 6 further generates a read pointer (RP) signal based on a code request signal from the video code buffer 10 (in the succeeding stage of FIG. 1B) and supplies the RP signal to the ring buffer 5. Such RP signal indicates an address of data written into the ring buffer 5 which is desired to be read out. As a result, upon receiving a RP signal, data from the desired address location or position of the ring buffer 5 is read out and supplied to the video code buffer 10, whereupon such data is stored therein. Therefore, the video code buffer 10 may generate a code request signal (which requests that data from the ring buffer 5 be transmitted to the video code buffer 10) and supply such signal to the control circuit 6 whereupon, in response thereto, data is supplied from the ring buffer 5 to the video code buffer 10.

The data stored in the video code buffer are supplied to the picture header detector 19, whereupon the picture header is detected so as to determine the type of picture, that is, whether the respective picture is an I, P or B picture. As hereinafter more fully described, control of the displayed image data is provided based on the detected picture type information.

A data signal from the picture header detector 19 is supplied to the inverse VLC circuit 11, wherein inverse VLC processing is performed. Upon completing such inverse VLC processing, the inverse VLC circuit 11 supplies an output processed data signal to the inverse quantization circuit 12 and a code request signal to the video code buffer 10. In response to the received code request signal, new data may be transmitted from the video buffer to the inverse VLC circuit by way of the picture header detection circuit 19.

In a manner similar to that previously described, the inverse VLC circuit 11 may also supply the size of a quantization step to the inverse quantization circuit 12 and a motion vector information signal to the motion compensation circuit 15. The inverse quantization circuit 12 inversely quantizes the data received from the inverse VLC circuit 11 in accordance with the size of the quantization step and outputs the obtained processed signal to the inverse DCT circuit 13, whereupon inverse DCT processing is performed. An output signal from the inverse DCT circuit 13 is supplied to one input terminal of the addition circuit 14. An output from the motion compensation circuit 15 formed in accordance with the type of picture (that is, I, P or B) is supplied to another input terminal of the addition circuit 14. The addition circuit 14 adds the received signals and supplies the obtained summed signal, by way of a switch 16d, through the appropriate one of contacts A–C to one of memories 16a, 16b and 16c of the frame memory bank 16 so as to be stored therein. Stored signals from the memories 16a, 16b and 16c may be supplied to the motion compensation circuit 15. Data from the memories 16a–16c of the frame memory 16 are read out under control through contacts A–C by way of a switch 16e so as to restore the original frame order, such as to that shown in FIG. 8A. The read out data are converted by a digital-to-analog (D/A) converter 17 into analog video signals and supplied to a display 18 so as to be displayed thereon. Therefore, the control circuit 6 causes data stored in the ring buffer 5 to be supplied to the video code buffer 10 in accordance with the code request signal from the video code buffer 10. When data processing of relatively simple video images is being performed and the amount of data transmitted from the video code buffer 10 to the inverse VLC circuit 11 decreases, the amount of data transmitted from the ring buffer 5 to the video code buffer 10 may also decrease. As a result, the amount of data stored in the ring buffer 5 may increase so as to cause an overflow condition of the ring buffer 5. In other words, the amount of data written into the ring buffer 5 by use of the WP signal may surpass the amount read out therefrom by use of the RP signal. To avoid such overflow condition, the quantity of data currently stored in the ring buffer 5 may be determined or calculated by, for example, utilizing address positions of the WP and RP signals controlled by the control circuit 6. Such determination may be performed by the track jump judging circuit 7. If the amount of the data determined to be stored in the ring buffer 5 exceeds a predetermined reference value, a track jump instruction signal is generated by the track jump judging circuit 7 and supplied therefrom to the tracking servo circuit 8. As a result, the pickup 2 may move or jump from the current track to another track. Therefore, the track jump judging circuit 7 determines if the ring buffer 5 may overflow and outputs a track jump instruction signal in response to such determination so as to cause the pickup to jump. The rate at which data is transmitted from the ring buffer 5 to the video code buffer 10 may be equal to or smaller than the rate at which data is transmitted from the ECC circuit 20 to the ring buffer 5. Such arrangement of transmission rates prevents the ring buffer 5 from being depleted of data. Furthermore, such arrangement of transmission rates enables the video code buffer 10 to transmit a code request signal to the ring buffer 5 irrespective of the timing of the track jump. As previously described, such code request signal requests that data from the ring buffer 5 be transmitted to the video code buffer 10. Therefore, the data reproducing apparatus of FIG. 1 causes the pickup 2 to track jump in accordance with the memory capacity of the ring buffer 5. As a result, overflow and/or underflow of the video code buffer 10 may be prevented, irrespective of the complexity or flatness of the video images recorded in the disc 1, so as to enable video images of uniform image quality to be continuously reproduced.

Timing of the writing/reading of the decoded pictures into and from the frame memories 16a–16c of the frame memory 16 for normal reproduction will now be described with reference to FIGS. 2A–2F. For this situation, the decoded pictures are arranged in the order shown in FIG. 8B. Furthermore, assume that the P picture $P_{-1}$ has already been written into the frame memory 16b.

The I picture $I_0$ is decoded and supplied from the addition circuit 14. The switch 16d is set to contact a so as to connect frame memory 16a to the output of the addition circuit 14. As a result, the I picture $I_0$ is stored in the frame memory 16a.

The picture data stored in the frame memories 16a–16c may be supplied to the motion compensation circuit 15 along with the motion vector information from the inverse VLC circuit 11 so as to form a motion prediction or compensated signal which, in turn, is supplied to the addition circuit 14 so as to be added to the output signal from the inverse DCT circuit 13. As such, the B picture $B_{-2}$ may then be decoded with reference to the I picture $I_0$ stored in the frame memory 16a and the P picture $P_{-1}$ stored in the frame memory 16b. The switch 16d is set to contact c and, as a result, the decoded B picture $B_{-2}$ is stored in the frame memory 16c. Furthermore, the switch 16e is set to contact c and, as a result, the B picture $B_{-2}$ stored in the frame memory 16c is supplied therefrom and displayed on the display 18.

Similarly, the B picture $B_{-1}$ may be decoded with reference to the I picture $I_0$ stored in the frame memory 16a and the P picture $P_{-1}$ stored in the frame memory 16b and then stored by way of the switch 16d into the frame memory 16c. The switch 16e is set to contact c and, as such, the B picture $B_{-1}$ stored in the frame memory c is supplied therefrom and displayed on the display 18.

The P picture $P_0$ may then be decoded with reference to I picture $I_0$ stored in the frame memory 16a. The switch 16d is set to contact b so as to overwrite or store the P picture $P_0$ into the frame memory 16b. Furthermore, the switch 16e is set to contact a and, as such, the I picture $I_0$ stored in the frame memory 16a is supplied therefrom and displayed on the display 18.

The B picture $B_0$ may then be decoded with reference to I picture $I_0$ stored in the frame memory 16a and the P picture $P_0$ stored in the frame memory 16b. The switch 16d is set to contact c so as to store the B picture $B_0$ in the frame memory 16c. Further, the switch 16e is set to the contact c and, as such, the B picture $B_0$ is supplied therefrom and displayed on the display 18.

Thereafter, and in a similar manner, the switches 16d and 16e are successively switched at the timing shown in FIGS.

2A and 2E, respectively, so as to provide an output from the frame memory bank 16 in the order of $B_1 \rightarrow P_0 \rightarrow B_2 \rightarrow B_3 \rightarrow P_1 \rightarrow \ldots$ and so forth for display on the display 18.

Therefore, by utilizing the frame memory bank in the manner previously described, the pictures may be rearranged and supplied to the display 18 in the original order shown in FIG. 8A.

Figure 5:
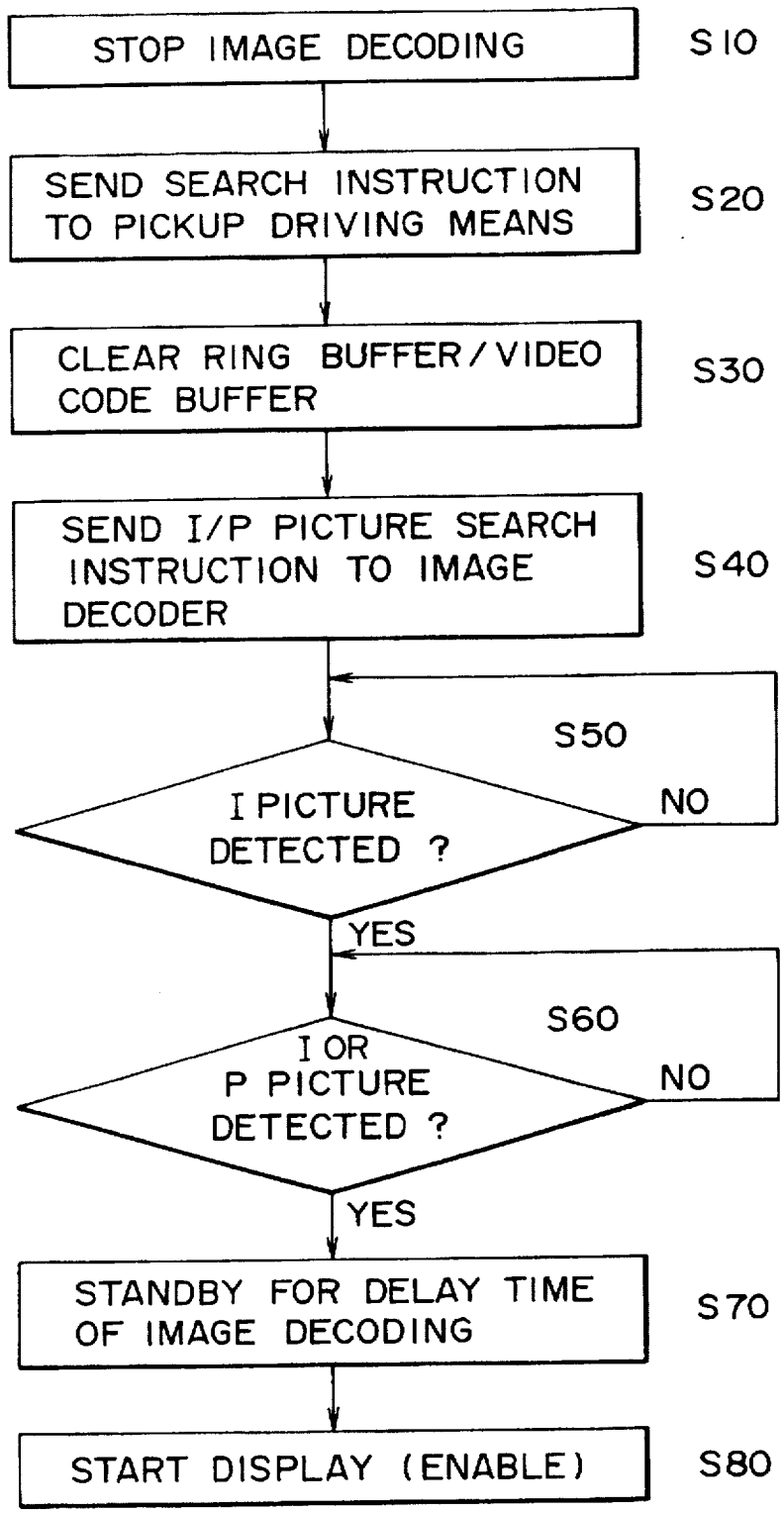
FIG. 5 is a flowchart to which reference will be made in explaining the operation of the present reproducing apparatus.

The operation of the present apparatus for reproducing encoded data during special processing, such as during a mode transition, random accessing or the like, will now be explained with reference to the flowchart of FIG. 5.

As shown in step S10, when random accessing or the like is being performed, the data reproducing apparatus stops the image decoding processing. Such termination of decoding processing may be performed by the control section 99. Furthermore, the switch 53 may be set to contact e so as to couple the blue back signal generator 51 to the display 18 by way of the D/A converter 17. The blue back signal generator 51 is adapted to generate a blue back signal. As such, when the switch 53 is set to contact e, a blue back screen is displayed on the display 18 instead of an output from the frame memory bank 16.

When random accessing is performed, an entry point may be set to an I picture, such as the I picture $I_0$ as indicated by an arrow in FIG. 10C. In this situation, a preceding P picture $P_{-1}$ is required to properly decode succeeding B pictures $B_{-2}$ and $B_{-1}$. However, since the I picture $I_0$ is the entry point, the P picture $P_{-1}$ has not been written or stored in the ring buffer 5. As a result, the B pictures $B_{-2}$ and $B_{-1}$ cannot be properly decoded. Accordingly, if the B pictures $B_{-2}$ and $B_{-1}$ are decoded without utilizing the P picture $P_{-1}$, a deformed image may be displayed. As such, the switch 53 is set to contact e so as to display a blue back screen instead of a deformed image or screen.

As a result of the above-described situation, a search instruction may be sent to the pickup driving device at step S20 to access data of another GOP which is different from that of the current GOP. Such search instruction may be generated by the control section 99 and supplied either directly or indirectly to the pickup 2. Processing then proceeds to step S30 wherein a portion(s) of the ring buffer 5 and the video code buffer 10 in which the newly accessed GOP data are to be written are cleared prior to writing such new GOP data. The new GOP data is then written into the cleared portion(s) of the ring buffer 5 and the video code buffer 10. Such data is read from the video code buffer 10 and supplied to the picture header detector 19 (FIG. 1B). The picture header detector 19 detects the type of pictures (I, P, B) corresponding to the picture data by utilizing the picture header which may be located at the top of each of the picture data.

At step S40, a search instruction or request for P and/or I pictures is supplied to the decoder 30 so as cause the same to detect such pictures. Such search request may be generated by the control section 99 and supplied to the decoder 30. Processing then proceeds to step S50 wherein a determination is made as to whether a first I picture has been detected. If an I picture has not been detected, then such determination continues. If, however, an I picture is detected at step S50, processing then proceeds to step S60 wherein a determination is made as to whether a second I picture or a P picture has been detected. If a second I picture or P picture has not been detected, then such determination continues. However, if a second I or P picture has been detected at step S60, then processing proceeds to step S70.

At step S70, the image decoding or the supplying of decoded image data is delayed by a predetermined delay time as hereinafter more fully explained. Processing then proceeds to step S80 wherein the switch 53 is switched to contact d so as to connect the frame or buffer memory 16 to the display 18 (by way of the D/A converter 17) so as to display the newly and properly decoded images.

Thus, in the situation in which the entry point is as shown in FIG. 10C, the I picture $I_0$ and P picture $P_0$ may be detected. As a result, succeeding pictures including B pictures may be correctly decoded. The timing is set at td as shown in FIG. 2.

The above-mentioned delay time of the decoder 30 will now be explained with reference to FIGS. 6A to 6D which are enlarged partial sections of FIGS. 2A and 2D–2F.

Although the timings for writing and reading shown in FIGS. 2A to 2F may indicate that some reading and writing operations are conducted simultaneously, such operations may not actually occur simultaneously and, in fact, may be nearly impossible to occur simultaneously. Instead, the reading (writing) timing may be delayed by a predetermined amount, such as by 1 field as illustrated in FIG. 6, relative to the writing (reading) timing. For example, the switch 16d may be set to contact c so as to be coupled to the frame memory 16c at timing t4 (as shown in FIG. 6A) wherein the B picture Bo is written into the frame memory 16c during a time period from the timing t4 to t5 (as shown in FIG. 6B). In this example, the switch 16e may be set to contact c so as to be coupled to the frame memory c at a timing point intermediate between t4 and t5 (as shown in FIG. 6C), whereupon the B picture Bo may be read out from the frame memory 16c and displayed (as shown in FIG. 6D). In this example, the distance between the adjacent timing points, such as t4 and t5, corresponds to 1 frame and the distance from the adjacent timing point (t5) to the intermediate point corresponds to 1 field. As such, the reading time is delayed by 1 field as compared with the writing time.

Delaying the reading time by 1 field relative to the writing time presents no difficulty. That is, since data may be continuously written into the frame memory and may be read out therefrom starting at the top or first written data, 1 field of data of a frame may be already written into the frame memory upon commencement of the reading operation. Therefore, as indicated in step S70 of FIG. 5, the decoded data are outputted from the frame memory bank 16 after being delayed by a time amount corresponding to at least 1 field.

FIG. 3 illustrates an apparatus for reproducing encoded data according to another embodiment of the present invention. As shown therein, with the exception that a frame memory 52 and a switch 54 replaces the blue back signal generator 51 and the switch 53, the apparatus of FIG. 3 is similar to that of FIG. 1. Accordingly, only these differences between the apparatus of FIG. 3 and that of FIG. 1 will be described herein.

The frame memory 52 is adapted to receive and store therein decoded image data from the frame memory bank 16. The switch 54 enables either the decoded image data from the frame memory bank 16 or the stored image data from the frame memory 52 to be supplied to the display 18. More specifically, and in a manner similar to that of the blue back signal generator 51 and switch 53 of FIG. 1, the switch 54 is (i) set to contact F so as to supply the decoded image signals from the frame memory bank 16 to the display 18 when such decoded signals are properly decoded and (ii) set to contact G to supply the stored image signals from the frame memory 52 to the display 18 when properly decoded signals can not be supplied from the frame memory bank 16 until correct images may be provided from the decoder 30. The frame memory 52 may be coupled to the frame memory bank 16 in a cascade arrangement inside the decoder 30 or outside the decoder.

Figure 4B:
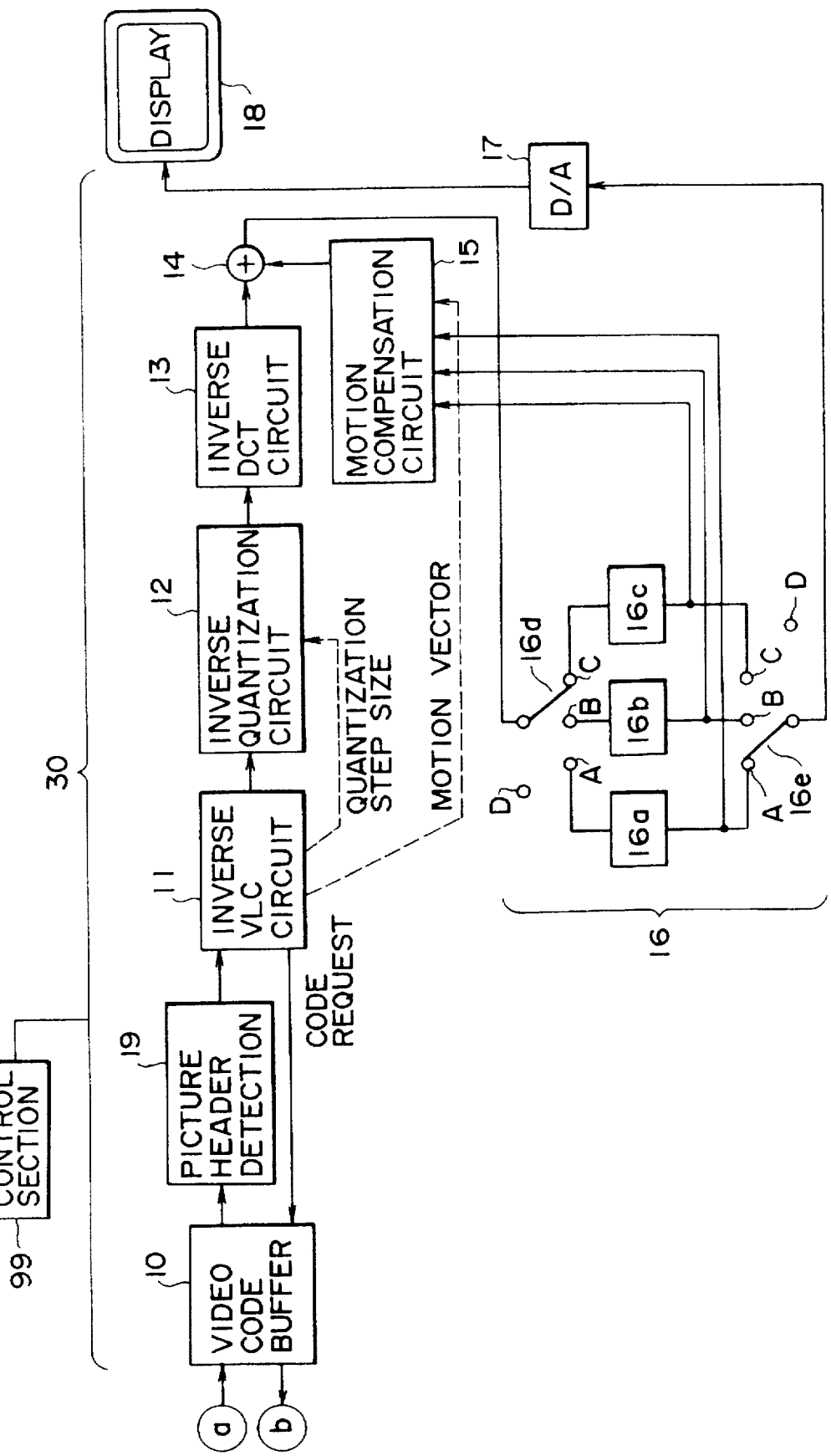

FIG. 4 illustrates an apparatus for reproducing encoded data according to another embodiment of the present invention. As shown therein, with the exception that a contact D replaces the frame memory 52 and switch 54 of FIG. 3 or the blue back signal generator 51 and switch 53 of FIG. 1, the apparatus of FIG. 4 is similar to that of either FIGS. 1 and 3. Accordingly, only these differences between the apparatus of FIG. 4 and those of FIGS. 1 and 3 will be described herein.

The switch 16d may be set to contact D during the period in which data is not properly decoded in the decoder 30 and is outputted from the addition circuit 14. As a result, such arrangement causes the improperly decoded data to be skipped. During the period in which data is properly decoded, the switch 16d operates in a normal manner. Alternatively, instead of the contact D for the switch 16d, a similar contact D may be arranged and utilized for the switch 16e.

Furthermore, since the picture data written into the frame memory bank 16 after access to the new GOP and until the picture data is properly decoded represent an I picture and either another I or a P picture, only two of the frame memories 16a–16c are utilized. Accordingly, one of the frame memories 16a–16c may not be utilized. As such, images previously decoded and written into the one remaining frame memory may be outputted therefrom. Thus, in this situation, already decoded images may be displayed until correctly decoded data are obtained without utilizing a new frame memory.

Therefore, during special processing such as a mode transition, random accessing and the like, image data may not be decoded and outputted until after the detection of an I picture and either another I or a P picture. The detected P and/or I pictures may be utilized to properly decode the image data, whereafter the properly decoded image data is supplied to the display. As a result, deformed images may be prevented from being displayed. Further, since previously decoded images or a blue back image may be displayed during the time period in which properly decoded images are unavailable, a sense of incongruity in the displayed images may not be observed during a mode transition, random accessing or the like.

The present invention is not limited to the above-described situations, but may be applied to a number of other situations. For example, consider a situation wherein an error which is difficult, if not impossible, to correct has been detected. The present invention may be utilized in this example to reproduce data by jumping to a neighboring GOP.

Although preferred embodiments of the present invention and modifications thereof have been described in detail herein, it is to be understood that this invention is not limited to these embodiments and modifications, and that other modifications and variations may be effected by one skilled in the art without departing from the spirit and scope of the invention as defined by the appended claims.

What is claimed is:

1. An apparatus for reproducing data compressed in accordance with a motion picture experts group (MPEG) standard and recorded on a recording medium, said apparatus comprising:

means for reading the compressed data from said recording medium, said data representing a plurality of frames which correspond to a plurality of groups of pictures (GOPs), in which each of said GOPs includes different types of pictures including intraframe predictively (I) encoded and interframe predictively (P) encoded pictures;

means for detecting the type of pictures corresponding to the read data;

means for decoding said read image data and for supplying the decoded image data to a display device; and means, responsive to a special processing operation, for causing an auxiliary signal to be supplied to said display device instead of the decoded image data until image data corresponding to an intraframe predictively encoded (I) picture and either another intraframe predictively encoded (I) picture or an interframe predictively encoded (P) picture are detected and, upon such detection, for properly decoding the respective image data by utilizing the image data corresponding to the detected P and/or I pictures and for supplying the properly decoded image data to said display device instead of said auxiliary signal.

2. An apparatus according to claim 1, wherein said means for causing includes a blue back signal generator for generating a blue back image signal and wherein said auxiliary signal is said blue back image signal.

3. An apparatus according to claim 1, wherein said means for causing includes a frame memory for storing previously decoded image data and wherein said auxiliary signal is formed from the stored image data.

4. An apparatus according to claim 1, wherein said special processing operation is random accessing.

5. An apparatus according to claim 1, wherein said special processing operation is a mode transition.

6. An apparatus according to claim 1, wherein the recording medium is a digital video disc and wherein the compressed data includes video signals compression-encoded in accordance with a motion picture experts group (MPEG) standard which are recorded along with audio signals onto said digital video disc.

7. A method for reproducing data compressed in accordance with a motion picture experts group (MPEG) standard and recorded on a recording medium, said method comprising the steps of:

reading the compressed data from said recording medium, said data representing a plurality of frames which correspond to a plurality of groups of pictures (GOPs), in which each of said GOPs includes different types of pictures including intraframe predictively (I) encoded and interframe predictively (P) encoded pictures;

determining the type of pictures corresponding to the read data;

decoding said read image data and supplying the decoded image data to a display device; and causing an auxiliary signal to be supplied to said display device instead of the decoded image data during a special processing operation until image data corresponding to an intraframe predictively encoded (I) picture and either another intraframe predictively encoded (I) picture or an interframe predictively encoded (P) picture are detected and, upon such detection, properly decoding the respective image data by utilizing the image data corresponding to the detected P and/or I pictures and supplying the properly decoded image data to said display device instead of said auxiliary signal.

15

8. A method according to claim 7, wherein said auxiliary signal is a blue back image signal.

9. A method according to claim 7, wherein previously decoded image data is stored in a frame memory and wherein said auxiliary signal is formed from the stored image data.

10. A method according to claim 7, wherein said special processing operation is random accessing.

11. A method according to claim 7, wherein said special processing operation is a mode transition.

12. A method according to claim 7, wherein the recording medium is a digital video disc and wherein the compressed data includes video signals compression-encoded in accordance with a motion picture experts group (MPEG) standard which are recorded along with audio signals onto said digital video disc.

13. An apparatus for reproducing data during normal and special operations, said data being compressed in accordance with a motion picture experts group (MPEG) standard and recorded on a recording medium, said apparatus comprising:

means for reading the compressed data from said recording medium, said data representing a plurality of frames which correspond to a plurality of groups of pictures (GOPs), in which each of said GOPs includes different types of pictures including intraframe predictively (I) encoded and interframe predictively (P) encoded pictures;

means for decoding said read image data and for supplying the decoded image data to a display device during said normal operation; and means for terminating the supply of decoded image data to said display device, for detecting image data corresponding to an intraframe predictively encoded (I) picture and either another intraframe predictively encoded (I) picture or an interframe predictively encoded (P) picture, for decoding said read image data by utilizing the detected P and/or I pictures so as to form properly decoded image data, and for supplying said properly decoded image data to said display device during said special operation.

14. An apparatus according to claim 13, further comprising blue back signal generator means for generating a blue back image signal and for supplying said blue back signal to said display device when the terminating means terminates the supply of decoded image data to said display device.

15. An apparatus according to claim 13, further comprising frame memory means for storing previously decoded image data and for supplying the stored previously decoded image data to said display device when the terminating means terminates the supply of decoded image data to said display device.

16. An apparatus according to claim 13, wherein said special processing operation is random accessing.

17. An apparatus according to claim 13, wherein said special processing operation is a mode transition.

18. An apparatus according to claim 13, wherein the recording medium is a digital video disc and wherein the compressed data includes video signals compression-encoded in accordance with a motion picture experts group (MPEG) standard which are recorded along with audio signals onto said digital video disc.

19. A method for reproducing data during normal and special operations, said data being compressed in accordance with a motion picture experts group (MPEG) standard and recorded on a recording medium, said method comprising the steps of:

reading the compressed data from said recording medium, said data representing a plurality of frames which correspond to a plurality of groups of pictures (GOPs), in which each of said GOPs includes different types of pictures including intraframe predictively (I) encoded and interframe predictively (P) encoded pictures;

decoding said read image data and supplying the decoded image data to a display device during said normal operation; and terminating the supply of decoded image data to said display device, detecting image data corresponding to an intraframe predictively encoded (I) picture and either another intraframe predictively encoded (I) picture or an interframe predictively encoded (P) picture, decoding said read image data by utilizing the detected P and/or I pictures so as to form properly decoded image data, and supplying said properly decoded image data to said display device during said special processing operation.

20. A method according to claim 19, further comprising generating a blue back image signal and supplying said blue back signal to said display device when the supply of decoded image data to said display device has been terminated.

21. A method according to claim 19, further comprising storing previously decoded image data in a frame memory and supplying the stored previously decoded image data to said display device when the supply of decoded image data to said display device has been terminated.

22. A method according to claim 19, wherein said special processing operation is random accessing.

23. A method according to claim 19, wherein said special processing operation is a mode transition.

24. A method according to claim 19, wherein the recording medium is a digital video disc and wherein the compressed data includes video signals compression-encoded in accordance with a motion picture experts group (MPEG) standard which are recorded along with audio signals onto said digital video disc.

* * * * *